UNITED STATES PATENT OFFICE 2,585,239

AMINE SALT OF PENICILLIN

Alphonse P. Granatek, Syracuse, N. Y., assignor to Bristol Laboratories Inc., Syracuse, N. Y., a corporation of New York No Drawing. Application December 28, 1949, Serial No. 135,521

2 Claims. (Cl. 260—239.1)

The present invention relates to a new amine salt of penicillin, more particularly N-pyridyl-N-p-chlorobenzyl-N'N'-dimethylethylenediamine which is capable of exerting a repository antibiotic action.

The new penicillin salt of the present invention has the following formula

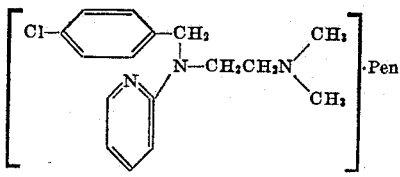

wherein Pen designates an acid penicillin radical or an active moiety thereof, capable of forming an addition salt with N-pyridyl-N-p-chlorobenzyl-N'N'-dimethylethylenediamine.

A more comprehensive understanding of this invention is obtained by reference to the following examples.

Example 1

The preparation of N-alpha-pyridyl-N-p-chlorobenzyl-N'N'-dimethylethylenediamine and corresponding hydrochloride.

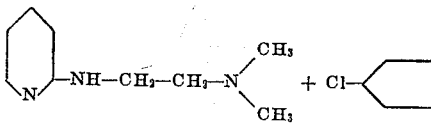 + Cl—⟨⟩—CH$_2$Cl + LiNH$_2$ ⟶ 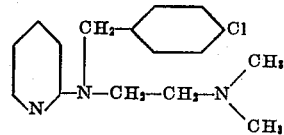

To a suspension of 9.2 gm. (0.4 mole) of lithium amide in 400 ml. of toluene was added 49.8 gm. (0.3 mole) N-alpha-pyridyl-N', N-dimethylethylenediamine. This mixture was refluxed for six hours and 49.0 gm. (0.3 mole) of p-chlorobenzyl chloride then added. Water was then added and the mixture transferred to a separatory funnel. The water layer was drawn off and the toluene layer washed with several portions of water. The solvent layer was drawn off, dried over potassium carbonate, concentrated, and the residue vacuum distilled. A yield of 78 gm. of material was obtained, boiling at 182–188° at 2.5 mm. pressure, with a bath temperature from 240–270°. To the base in isopropanol was added a slight excess over the theoretical quantity of 8 N hydrogen chloride in methanol. The crystals were filtered off and recrystallized from isopropanol. Methyl isobutyl ketone was used as a recrystallizing solvent and crystals melting at 174–175° were obtained. Some methyl isobutylketone insoluble crystals were obtained and melted at 195–200°.

The material melting at 174–175°, was submitted for analysis.

Analysis: Calculated for $C_{16}H_{20}N_3Cl \cdot HCl$

|   | Calculated | Found |
|---|---|---|
| C | 58.90 | 58.80 |
| H | 6.19 | 6.43 |

1 gram of N-pyridyl-N-p-chlorobenzyl-N'N'-dimethylethylenediamine hydrochloride prepared by the above method was suspended in ether and the whole made basic by the addition of sodium hydroxide. A second solution was prepared by adding 1.09 grams potassium penicillin to ether with subsequent acidification by the addition of phosphoric acid. The ether extracts were dried with sodium anhydrous sulfate, filtered and then added together and the sides of the vessel containing the same was scratched with a laboratory stirring rod, refrigerated and a crystalline precipitate was obtained having a potency of 550 u./mg. and a water solubility of 1335 units per cc.

By using the same quantities the above reaction can be carried out in aqueous solution. If necessary the solution may be seeded to hasten crystallization.

Example 2

10 grams of N-pyridyl-N-p-chlorobenzyl-N'N'-dimethylethylenediamine hydrochloride was suspended in ether and the whole made basic by addition of sodium hydroxide. A second solution was prepared by adding 10.9 grams of potassium penicillin G to ether with subsequent acidification by the addition of phosphoric acid. The ether extracts were dried with anhydrous sodium sulfate, filtered, cooled in ice bath and added together. A heavy gum was obtained. The sides of the reaction flask were scratched with a glass stirring rod and seeded with a crystal from Example 1. This was refrigerated overnight. A white crystalline product was obtained, and the product was filtered and dried in a vacuum desiccator.

Yield—14 grams
Potency—1382 u./mg.
Solubility—4800 u./cc.

While the present invention has been described with particular reference to N-pyridyl-N-p-chlorobenzyl-N'N'-dimethylethylenediamine addition salts of penicillin G it will be understood that N-pyridyl-N-p-chlorobenzyl-N'N'-dimethylethylenediamine salts of other penicillins are also included within the scope of this invention. For instance the natural penicillins such as penicillin G, F, X, dihydro F and K, and mixtures of two or more of such penicillins are included, particularly, mixtures containing at least 85% penicillin G.

Also other salts of N-pyridyl-N-p-chlorobenzyl-N'N'-dimethylethylenediamine other than the hydrochloride may be employed. Examples of such salts are hydrobromide, sulfate, citrate, and tartrate. In general, any organic solvent soluble or water soluble salt may be employed.

It will be understood that the reaction can be carried out in water and organic solvents other than ether. Examples of such solvents are butanol, propanol, amyl acetate, methyl amyl acetate, isopropyl ether, mesityl oxide, and methyl isobutyl ketone.

The products of this invention are also useful for oral and topical administration and as ingredients of pharmaceutical products for such use.

It will be understood that, without departing from the spirit of the invention or the scope of the claims, various modifications may be made in the specific expedients described. The latter are illustrative only, and not offered in a restricting sense, it being desired that only such limitations shall be placed thereon as may be required by the state of the prior art.

I claim:

1. A salt of penicillin and N-pyridyl-N-p-chlorobenzyl-N'N'-dimethylethylenediamine.

2. A salt of penicillin G and N-pyridyl-N-p-chlorobenzyl-N'N'-dimethylethylenediamine.

ALPHONSE P. GRANATEK.

REFERENCES CITED

The following references are of record in the file of this patent:

UNITED STATES PATENTS

| Number | Name | Date |
| --- | --- | --- |
| 2,483,382 | Goldberg et al. | Sept. 27, 1949 |
| 2,493,625 | Goldberg et al. | Jan. 3, 1950 |
| 2,504,182 | Cooper | Apr. 18, 1950 |
| 2,533,066 | Taplin et al. | Dec. 5, 1950 |

FOREIGN PATENTS

| Number | Country | Date |
| --- | --- | --- |
| 604,563 | Great Britain | July 6, 1948 |
| 607,004 | Great Britain | Aug. 24, 1948 |

OTHER REFERENCES

Salivar et al.: "J. Am. Chem. Soc.," vol. 70, March 1948, p. 1287.

"Am. J. of Pharmacy," July 1945, p. 253.

Monash: "Science," vol. 107, October 17, 1947, p. 370.

"Proc. Staff Meet. Mayo Clinic," December 10, 1947, p. 567.

Destouches et al.: "Comptes Rendus," vol. 228, June 27, 1949, p. 2066.

Ballaro: "Ciencia e Investigacion," vol. 4, November 1948, pp. 481 and 482.

Merck Report CMR–M–XV, b–March 31, 1944, published 1947, p. 1.

British Report CMR–Br. 234, CPS–687; PB 79,927, December 5, 1947 (published) pp. 1–4.